Sept. 19, 1961 S. L. HEYLMUN 3,000,111
METER
Filed Jan. 21, 1959 3 Sheets-Sheet 2

INVENTOR.
Stanley L. Heylmun
BY
Walter G. Finch
Attorney

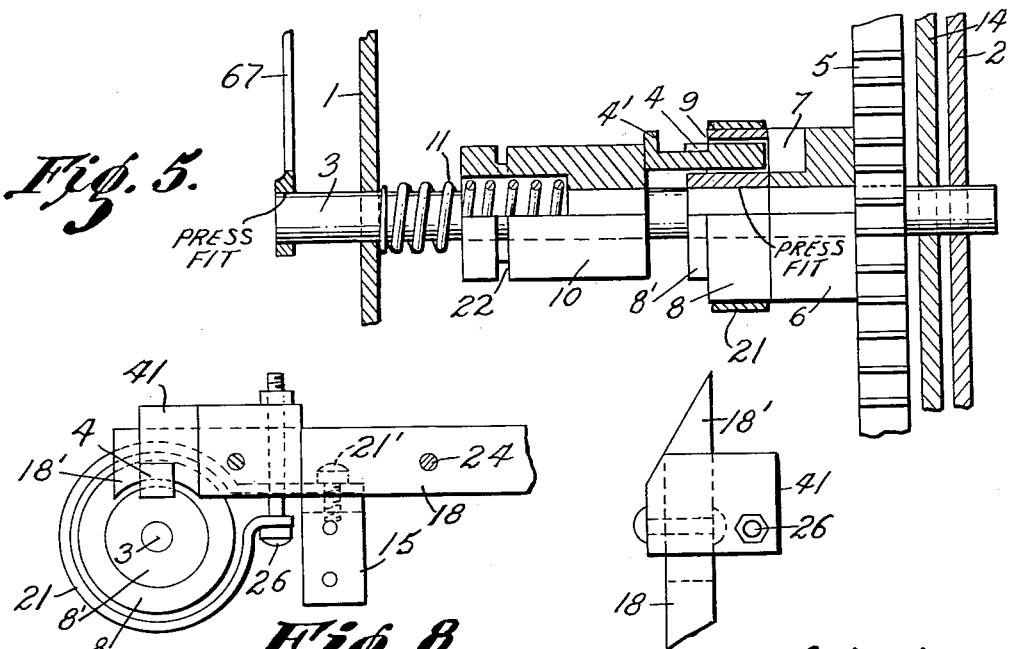
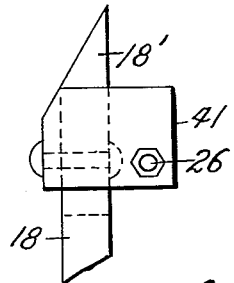
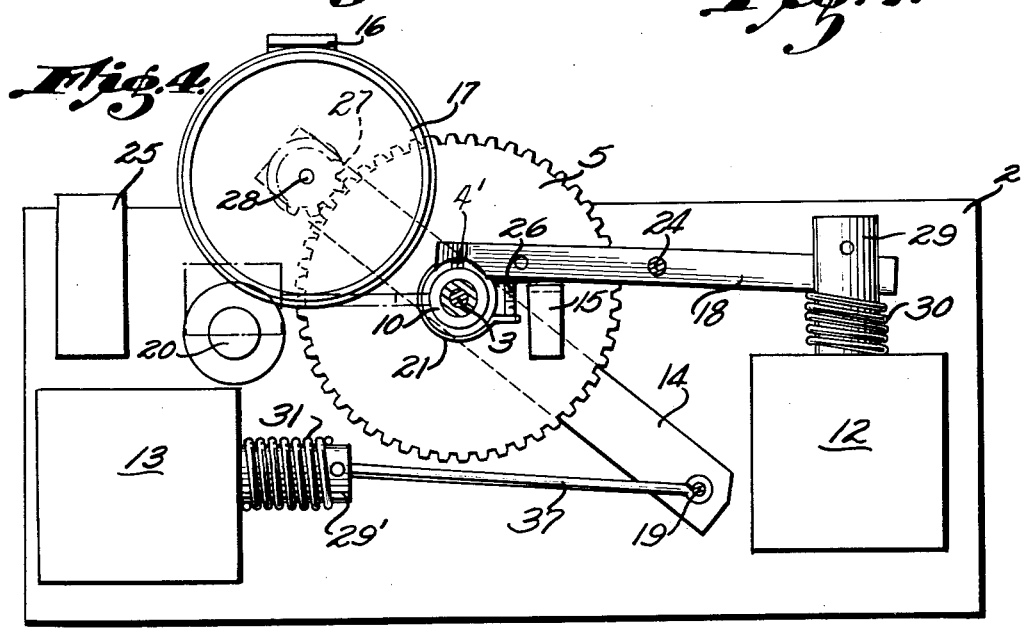

United States Patent Office  3,000,111
Patented Sept. 19, 1961

3,000,111
METER
Stanley L. Heylmun, 4945 Edgemere Ave., Baltimore, Md.
Filed Jan. 21, 1959, Ser. No. 788,241
8 Claims. (Cl. 35—11)

This invention relates to psychophysical testing equipment for driver education, and more particularly it pertains to a novel meter arrangement for determining reaction time of a driver. This patent application is a continuation-in-part of my U.S. patent application Serial Number 606,329, filed by applicant on August 27, 1956, for "Meter" and since abandoned.

Although this invention is illustrated in conjunction with psychophysical testing equipment for driver education, it is to be pointed out that the invention has many other applications where it is desired to measure the reaction time for performing various types of functions, such as operating various types of machinery, meters, and the like.

For a long time, there has been a desire on the part of instructors in driver education to have self-administering testing equipment for measuring the time required for a person to react to various types of signals. For example, it is important in driver education to determine or measure the time required for a person to react to a visible signal by pressing a lever, such as a brake pedal of an automobile, or the time required to move the foot from an accelerator pedal to the brake pedal based on seeing a certain visible signal change to different visible signal, such as a green light to a red light.

It is one of the objects of this invention, therefore, to provide a novel meter device which will enable an operator thereof to obtain an accurate measurement of the time required to coordinate mental and muscular reactions.

Still another object of this invention is to provide a unique meter device which is designed for a self-administering time reaction test.

And still another object of this invention is to provide a simple meter device in which the operator taking the reaction test merely operates the switches according to the signal lights.

To provide a meter device for performing a time reaction test in which the meter device starts, stops and resets automatically, is still another object of this invention.

And still another object of this invention is to provide a meter device for measuring reaction time of a person which only requires that person to operate the meter without external aid.

Still another object of this invention is to provide a meter device for accurately measuring mental and muscular reaction time which is economical to manufacture, compact, efficient and reliable in operation, and which is easy to assemble, disassemble, and to maintain, are other objects of this invention.

These and other objects and advantages of this invention will become more readily apparent by reference to the following description taken in conjunction with the accompanying drawings in which:

FIG. 4 is a cross section similar to FIG. 3 illustrating the component parts in a different position;

FIG. 5 is an enlarged plan view of details of FIG. 2 with parts being shown in cross section;

FIG. 6 is a schematic of the circuitry for the meter arrangement;

FIG. 7 is an enlarged view of detail of FIG. 2; and

FIG. 8 is an enlarged side view of details of FIGS. 3 and 4.

Figure 1:
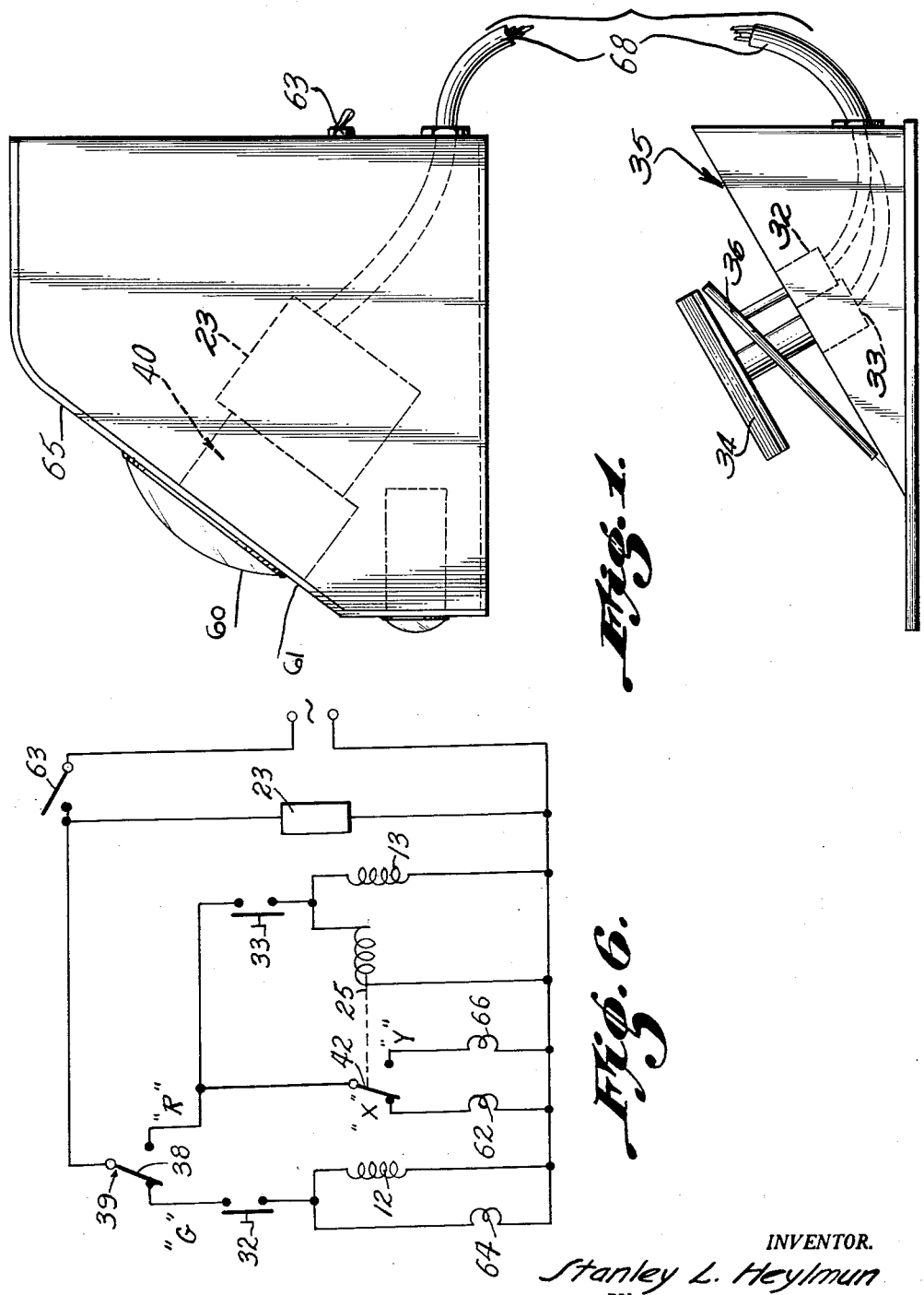
FIG. 1 is a side view of the meter arrangement 40 comprising this invention.

Referring now to the figures of the drawings and particularly FIGS. 1, 5 and 6, there is illustrated a novel meter device 40 for accurately measuring mental and muscular reaction time of a person, such as the operator of an automobile.

This meter device 40 consists of a cabinet 65 having a front panel section 61 for receiving a dial 60, graduated in one one-hundredths of a second, an indicator hand 67, and three spaced lamp bulbs 62, 64 and 66, of red, green and white color, mounted below the dial 60. Lamp bulbs 62, 64, and 66 are connected in an electrical circuit which will be described more hereinafter.

Also shown in FIG. 1 is an assembly 35 corresponding to the floor control elements of an automobile including a brake pedal 34, a brake switch 33, an accelerator pedal 36, and an accelerator switch 32. The brake switch 33 and accelerator switch 32 are shown in the electrical circuit of FIG. 6. These elements are connected to a meter device 40 by a cable 68 from the switches 32 and 33.

Figure 2:
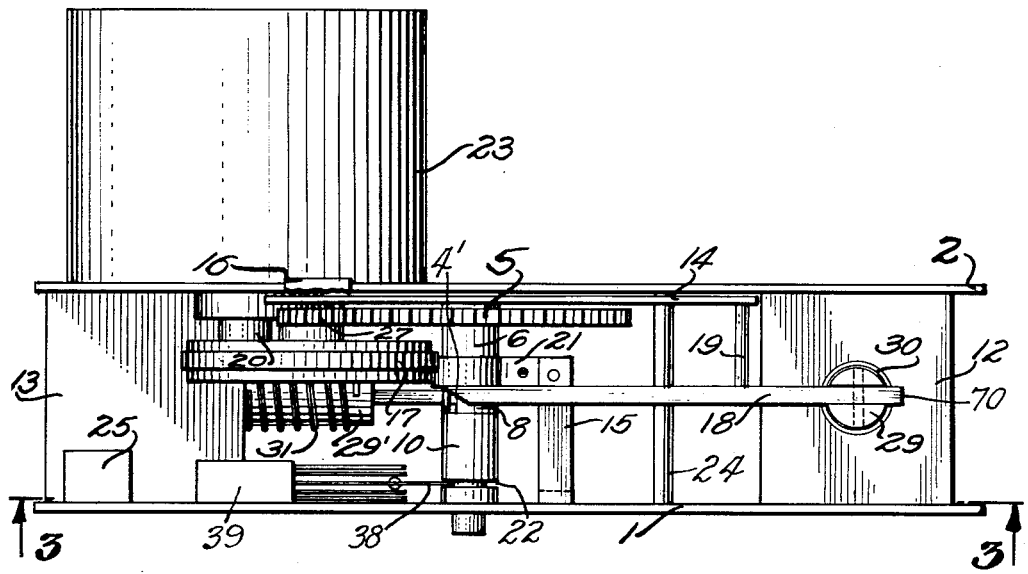
FIG. 2 is a plan view of the interior of the meter arrangement 40 with the case removed.
Figure 3:
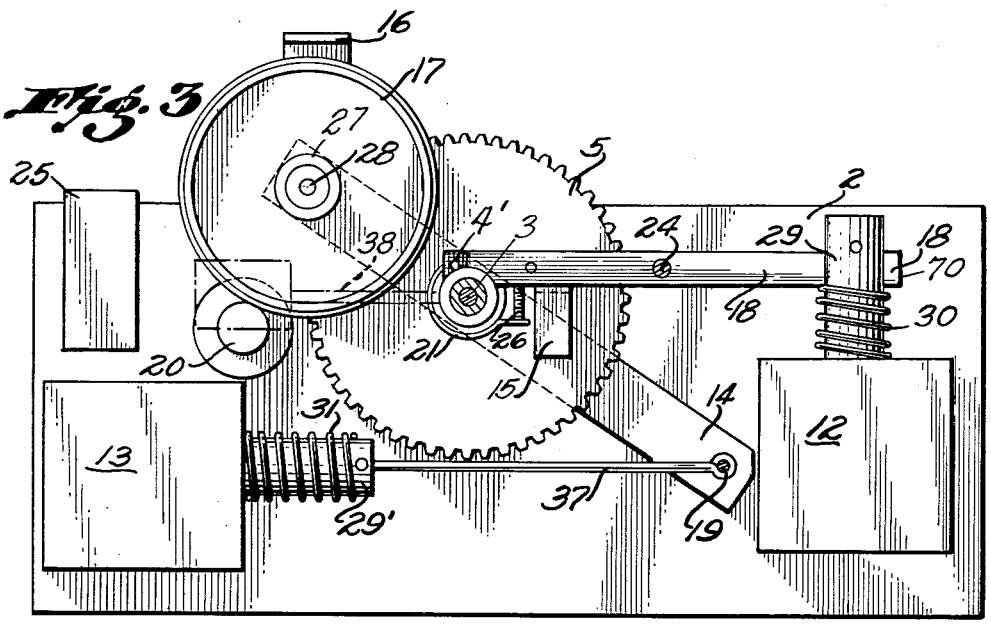
FIG. 3 is a cross section taken along line 3—3 of FIG. 2 illustrating the component parts in one position.

Referring now to FIGS. 2 to 5 of the drawings, there is illustrated the meter device 40 as actually mounted within the cabinet 65. The operating elements are mounted between two spaced panels 1 and 2, front and rear, respectively, of the cabinet 65. A 110 volt, 60 cycle, constant speed, A.C. motor 23 operating clockwise facing shaft (which can be furnished in various other voltages to meet existing conditions) is secured to the rear panel 2 by suitable means, such as bolts (not shown). The shaft of this motor 23 passes through an opening (not shown) provided in the rear of panel 2 and has a drive pulley 20, as shown in FIGS. 2 and 3, mounted on the end thereof, the purpose of which will be explained more hereinafter.

A solenoid 12, as best illustrated in FIGS. 2, 3, and 4, is positioned between the front panel 1 and the rear panel 2 by suitable means, such as bolts or the like. A sliding drive key operating lever 18 is pivotally mounted at substantially its mid-point to a fulcrum shaft 24, as shown in FIGS. 3, 4, 5, and 8, which extends between the front and rear panels 1 and 2, respectively. One end of the sliding drive key operating lever 18 is secured to the piston 29 of the solenoid 12, with the beveled free end 18' resting on a brake disc 8 and stop bracket 15. The piston 29 of the solenoid 12 is biased by a coil spring 30, shown best in FIGS. 2, 3 and 4.

The previously mentioned stop bracket 15 is secured to the front panel 1 and is extended therefrom to a location near the beveled end 18' of the sliding drive key operating lever 18. A brake band 21 is secured at one end to stop bracket 15 as shown in FIG. 8. Brake band 21 encompasses the brake disc 8 to prevent movement of the indicator hand 67 on dial 60. A large gear 5 with a large gear hub 6, the previously mentioned brake disc 8, and a shift collar 10 are mounted in the order named on shaft 3. The large gear 5, the hub 6, and the shift collar 10 turn free on the shaft 3. The brake disc 8 and the indicator hand 67, however, are rigidly secured to the shaft 3 for rotation therewith. A coil spring 11 within shift collar 10 is utilized to bias these elements into operation, as shown best in FIG. 5.

An adjustment screw 26, shown best in FIGS. 3 and 4, for adjusting the brake band 21 is secured between the free end of the brake band 21 and a brake operating bracket 41, shown in FIGS. 7 and 8, mounted near the beveled end 18' of the sliding drive key operating lever 18.

A slot 7, as shown in FIG. 5, is provided in the gear hub 6, while a square hole 9 is provided in the brake disc 8 for receiving a sliding drive key 4. Sliding drive key is carried in the square hole 9 of brake disc 8.

When the end of the sliding drive key operating lever 18 is pulled down by the inward movement of solenoid piston 29 of solenoid 12, the beveled opposite end 18' of sliding drive key operating lever 18 is lifted from between a sliding drive key lug 4' and brake disc 8, thus releasing the sliding drive key 4. At the same time, brake operating bracket 41 is raised and it pulls on brake adjusting screw 26 which is connected to the free end of brake band 21, thus tightening the brake band 21 around brake disc 8 to prevent movement of the indicator hand 67 on the dial 60 until the test starts to register.

The large gear 5 is arranged to engage a small drive gear 27, as shown best in FIG. 2. This gear 27 is positioned on a brake shift lever stud 28 mounted near the end of a brake shift lever 14. A transmitter pulley 17 is secured to the extending hub of the small drive gear 27. This transmitter pulley 17 is arranged to engage the drive pulley 20 mounted on the end of the shaft of motor 23. A transmitter pulley brake shoe 16 is secured to the rear panel 2 for the transmitter pulley 17.

A second solenoid 13, as best illustrated in FIGS. 2, 3 and 4, is positioned between the front panel 1 and the rear panel 2 by suitable means such as bolts or the like. The piston 29' of solenoid 13 is connected to a link element 37 which, in turn, has its opposite end connected to brake lever draw shaft 19. Piston 29' of solenoid 13 is biased by a coil spring 31. The main shaft 3, passing through a hole near the center of the brake shift lever 14, is the fulcrum for this arrangement as illustrated in FIGS. 3 and 4.

An "Off-On" switch 63, shown in FIGS. 1 and 6, is utilized to start and stop the constant speed motor 23 and at the same time energize the operating circuit. The "Off-On" switch 63 is connected to a suitable source of power by a second cable (not shown).

The operation of the meter device will now be explained in connection with the electrical circuitry illustrated in FIG. 6, together with FIGS. 1 to 5, and 7 and 8. When the "Off-On" switch 63 is placed on the "On" position, it starts the constant speed electric motor 23 and through the drive pulley 20, the transmitter pulley 17, and the small drive gear 27 causes the large gear 5 to turn in a clockwise direction at exactly 60 revolutions per minute.

At the same time, the single pole, double throw switch lever 38 of a mechanically operated single pole double throw switch 39 energizes the starting circuit "G" through as far as accelerator switch 32. Single pole double throw switch 39 is normally connected to the "G" circuit, and through shift collar 10 biased by shift collar spring 11, switch 39 is mechanically operated by sliding drive key 4.

When the normally "Off" switch 32 in the "G" circuit is closed, the green light 64 lights, and piston 29 of solenoid 12 pulls the end 70 as shown in FIGS. 2 and 3 of sliding drive key operating lever 18 downward releasing the sliding drive key 4. The end of sliding drive key 4 opposite the sliding drive key lug 4' is now pressed against the face of hub 6 of the large gear 5, since the bevelled end 18' of the sliding drive key operating lever 18 has been lifted from between sliding drive key lug 4' and brake disc 8.

At the same time, operating bracket 41 attached near the bevelled end 18' of the sliding drive key operating lever 18 tightens brake band 21 around the brake disc 8, holding main shaft 3, and brake disc 8 with the sliding drive key 4, and indicating hand 67 stationary and in a starting position. When the accelerator switch 32 is depressed the solenoid 12 through the mechanically operated switch 39 is energized and it causes the sliding drive key operating lever 18 to be rotated in a clockwise direction about shaft 24 (pivot). The rotation of the lever 18 causes the brake band 21 to be applied to the brake disc 8, thereby arresting the rotation of brake disc 8 as well as shaft 3 and any member secured thereto. At the same time, end 18' of lever 18 is raised out of engagement with sliding key 4. When slot 7 in the hub 6 of the large gear 5 is rotated in line with the sliding drive key hole 9 in brake disc 8, the sliding drive key 4 is forced into slot 7 of the large gear hub 6 by means of the pressure of spring 11 against the end of the shift collar 10 carrying the annular slot 22 with it. Switch lever 38 of the mechanically operated single pole, double throw switch 39 being controlled by the movement of the shift collar 10 through the annular slot 22 disconnects the circuit to solenoid 12. Since solenoid 12 is now de-energized, the solenoid piston return spring 30 rotates lever 18 in a counterclockwise direction about shaft 24, releasing brake band 21 from brake disc 8 and thus permitting the brake disc 8 as well as shaft 3 and any member secured thereto to rotate. Main shaft 3, brake disc 8, sliding drive key 4 and indicating hand 67 now begin to rotate. At the time, shift collar 10 is allowed to move endwise by sliding drive key 4 entering slot 7 in the hub 6 of large gear 5.

Switch lever 38 of the mechanically operated single pole double throw switch 39, which is positioned in an annular slot 22 in the shift collar 10, disconnects switch lever 38 from the circuit "G" and connects switch lever 38 with a circuit "R." This movement of switch lever 38 causes the "G" circuit, the green light 64, the solenoid 12 and the accelerator switch 32 to become inactive and, at the same time, energizes the "R" circuit which is associated with the red light 62, solenoid 13, brake switch 33 and single pole double throw relay 25.

As a result of accelerator switch 32 being disconnected from the current supply by the switch lever 38 of the single pole double throw mechanically operated switch 39, the green light 64 goes out, the solenoid 12 is de-energized and the spring 30 biasing piston 29 of solenoid 12 returns the sliding drive key operating lever 18 to a position on top of sliding drive key lug 4' and releases brake band 21 from around brake disc 8.

As lever 18 and its beveled end 18' is released by solenoid 12, the lever 18 and the beveled end 18' come to rest atop the sliding drive key lug 4' until lug 4' rotates clockwise away. Since sliding key 4 has seated into the recess 7 of hub 6, the position of lug 4' has also changed thus preventing the beveled end 18' of the lever 18 any possibility of withdrawing the sliding key 4 from recess 7 until one complete revolution. As brake disc 8 starts to move, lever 18 and end 18' thereof drops from lug 4' to step 8' of brake disc 8, and is then in readiness to withdraw sliding key 4 by means of lug 4' from the recess 7 after one revolution. The position of lug 4' is spaced far enough from the face of the brake disc 8 to allow engagement of the point of end 18' of lever 18 to start withdrawal.

As the "R" circuit is energized through as far as brake switch 33, the red light 62 lights (the signal to push the normally "Off" brake switch 33 in this circuit) and the hand 67 on the dial 60 begins to rotate.

The reaction test will now be explained.

When the normally "Off" switch 33 in the "R" circuit is closed, solenoid 13 becomes energized and through its connecting link 37, brake lever draw shaft 19, and brake shift lever 14 lifts the transmitter pulley 17 from contact with the drive pulley 20 and presses it against brake shoe 16, thus stopping the large gear 5 and indicator hand 67 on dial 60 instantly.

At the same time, relay 25 is energized to move armature 42 from contact with "X" circuit to contact the "Y" circuit thus cutting "Off" the red light 62 and bringing "On" the white light 66. When this occurs, a reading on the dial 60 should be taken.

The time measured on the dial 60 is representative of the time required to move the foot of the person being tested from the operating switch 32 of the accelerator 36 to the operating switch 33 of the brake pedal 34.

When the normally "Off" switch 33 in the "R" circuit is opened, the coil in relay 25 is de-energized allowing the armature 42 to return to its contact with the "X" circuit, thus cutting "Off" the "Y" circuit. As a result, the white light 66 goes out and the red light 62 comes "On" again. At the same time, solenoid 13 is de-energized, transmitter pulley 17 is released from its contact with brake shoe 16 and is returned in contact with drive pulley 20 by means of spring 31 biasing piston 29' of solenoid 13 to turn the large gear 5 again.

As the large gear 5 is rotated, brake disc 8 carrying sliding drive key 4 with its lug 4' in sliding drive key hole 9 is rotated against the bevelled end 18' of the sliding drive key operating lever 18. The bevelled end 18' of the sliding drive key operating lever 18 is wedged between the sliding drive key lug 4' and the brake disc 8 and it forces the sliding drive key 4 out of the slot 7 in hub 6 of large gear 5.

As sliding drive key 4 with its lug 4' is forced out of slot 7 in hub 6 of the large gear 5, it exerts pressure against the shift collar 10 and shift collar spring 11 and moves them back to their original positions. As shift collar 10 moves to its original position, annular slot 22 carries the switch 39 back in contact with the "G" circuit and the "R" circuit becomes dead.

It is to be noted the elapsed time between the coming on of the green light 64, at which time solenoid 12 is energized to pull on lever 18 to release the sliding drive key 4, and the coming on of the red light 62 when the instrument begins to register, can in no manner be determined by the person being tested, since this element depends on the position of slot 7 in the hub 6 of the large gear 5 to the sliding drive key 4, which is now being held stationary, at the time accelerator switch 32 is closed.

Obviously, many modificaions and variations of the present invention are possible in light of the above teachings. It is, therefore, to be understood that within the scope of the appended claims, the invention may be practical than as specifically described.

What is claimed is:

1. A reaction time tester meter, comprising, an electric motor, a source of power for said electric motor, said electric motor having a drive pulley associated therewith, structure including a friction transmitter pulley carrying a first gear means and mechanically associated with said drive pulley, a second gear means engaged with said first gear means, said first gear means transmitting power from said drive pulley to said second gear means, an indicating dial, a clutch means located between said second gear means and said indicating dial, a pivotally mounted clutch lever including a first solenoid means for moving said clutch lever, and a linkage including a second solenoid means for moving said friction transmitter pulley out of engagement with said drive pulley.

2. An arrangement as recited in claim 1, and an indicator light associated with each solenoid.

3. An arrangement as recited in claim 2, including simulated accelerator and brake pedals controlling said solenoids, respectively, whereby the time element between depressing of the accelerator pedal and the start of recording of the meter is always variable.

4. A reaction time tester comprising, an electric motor having an output wheel, means having a shaft with an indicator thereon, a first gear means, clutch means positioned between said shaft and first gear means, second gear means, a second wheel coupled to said second gear means, said second gear means meshing with said first gear means and movable to carry said second wheel into and out of contact with said output wheel, a first solenoid for controlling said clutch means, and a second solenoid for controlling the movement of said two wheels into and out of contact.

5. A reaction time tester as recited in claim 4, including brake means for arresting rotation of said shaft.

6. A reaction time tester as recited in claim 5, including simulated accelerator and brake pedals controlling said first and second solenoids, respectively, whereby the time element between the depressing of the accelerator pedal and the start of recording of the tester is always variable.

7. A reaction time tester as recited in claim 6, and an indicator light associated with each solenoid.

8. A reaction time tester as recited in claim 7, and a brake for said wheel coupled to said second gear means.

References Cited in the file of this patent

UNITED STATES PATENTS

| | | |
|---|---|---|
| 2,023,488 | Poppen | Dec. 10, 1935 |
| 2,177,501 | Smalley | Oct. 24, 1939 |
| 2,341,678 | Wickes | Feb. 15, 1944 |

FOREIGN PATENTS

| | | |
|---|---|---|
| 714,921 | Great Britain | Sept. 8, 1954 |